US011981378B2

(12) United States Patent
Lombard et al.

(10) Patent No.: US 11,981,378 B2
(45) Date of Patent: May 14, 2024

(54) AUTOMATED DEVICE FOR BUILDING BOARDS

(71) Applicant: SAINT-GOBAIN PLACO, Suresnes (FR)

(72) Inventors: Pierre Lombard, Aubervilliers (FR); Stéphane Dieu, Aizenay (FR)

(73) Assignee: SAINT-GOBAIN PLACO, Courbevoie (FR)

( * ) Notice: Subject to any disclaimer, the term of this patent is extended or adjusted under 35 U.S.C. 154(b) by 876 days.

(21) Appl. No.: 17/044,915

(22) PCT Filed: Apr. 3, 2019

(86) PCT No.: PCT/FR2019/050782
§ 371 (c)(1),
(2) Date: Oct. 2, 2020

(87) PCT Pub. No.: WO2019/193285
PCT Pub. Date: Oct. 10, 2019

(65) Prior Publication Data
US 2021/0039730 A1 Feb. 11, 2021

(30) Foreign Application Priority Data

Apr. 4, 2018 (FR) ...................................... 1852937

(51) Int. Cl.
*B62D 57/024* (2006.01)
*E04F 21/18* (2006.01)
*E04G 21/16* (2006.01)

(52) U.S. Cl.
CPC ........ *B62D 57/024* (2013.01); *E04F 21/1872* (2013.01); *E04G 21/16* (2013.01)

(58) Field of Classification Search
CPC .... B62D 57/024; E04F 21/1872; E04G 21/16
See application file for complete search history.

(56) References Cited

U.S. PATENT DOCUMENTS 4,940,382 A * 7/1990 Castelain ............... B62D 57/00
180/8.5
6,129,489 A * 10/2000 Linderholm ......... B23Q 9/0014
409/178

(Continued)

FOREIGN PATENT DOCUMENTS

EP 3 031 705 A1 6/2016
WO WO 2013/019301 A1 2/2013

OTHER PUBLICATIONS

International Search Report as issued in International Patent Application No. PCT/FR2019/050782, dated May 27, 2019.

*Primary Examiner* — Kevin Hurley
*Assistant Examiner* — Michael R Stabley
(74) *Attorney, Agent, or Firm* — Pillsbury Winthrop Shaw Pittman LLP

(57) ABSTRACT

An automated device is configured to move in contact with a building board. The automated device includes a chassis bearing a tool, the tool being configured to carry out a mechanical operation on the building board. The automated device includes at least one suction member and at least one system for setting the automated device in motion. The suction member includes at least two chambers allowing the automated device to adhere to the building board, the tool being situated between the at least two chambers.

9 Claims, 6 Drawing Sheets

(56) References Cited

U.S. PATENT DOCUMENTS

| | | | |
|---|---|---|---|
| 7,076,335 B2* | 7/2006 | Seemann | B62D 57/00 |
| | | | 901/1 |
| 7,155,307 B2* | 12/2006 | Seemann | B62D 57/024 |
| | | | 15/53.4 |
| 7,280,890 B2* | 10/2007 | Seemann | B64F 5/60 |
| | | | 180/164 |
| 9,221,506 B1 | 12/2015 | Georgeson et al. | |
| 9,352,435 B2* | 5/2016 | Spishak | G05D 1/0261 |
| 9,636,753 B2* | 5/2017 | Anson | B23B 49/026 |
| 9,782,836 B2* | 10/2017 | Spishak | B60B 19/003 |
| 10,001,245 B2* | 6/2018 | Bain | B60V 1/00 |
| 10,071,429 B2* | 9/2018 | Spishak | B23B 39/14 |
| 10,696,338 B2* | 6/2020 | Matsuyama | B62D 57/024 |
| 11,007,635 B2* | 5/2021 | Georgeson | B62D 57/024 |
| 11,502,729 B1* | 11/2022 | Georgeson | H04B 5/0031 |
| 2003/0048081 A1* | 3/2003 | Seemann | B62D 57/00 |
| | | | 318/68 |
| 2011/0002751 A1 | 1/2011 | Katzenberger et al. | |
| 2011/0243676 A1* | 10/2011 | Marguet | B23B 41/00 |
| | | | 408/72 R |
| 2013/0024067 A1* | 1/2013 | Troy | B64F 5/30 |
| | | | 180/69.6 |
| 2013/0174397 A1* | 7/2013 | Katzenberger | B21J 15/10 |
| | | | 408/1 R |
| 2015/0003927 A1* | 1/2015 | Spishak | G05B 19/182 |
| | | | 408/1 R |
| 2016/0161055 A1* | 6/2016 | Bain | B25J 5/002 |
| | | | 248/646 |

\* cited by examiner

AUTOMATED DEVICE FOR BUILDING BOARDS

CROSS-REFERENCE TO RELATED APPLICATIONS

This application is the U.S. National Stage of PCT/FR2019/050782, filed Apr. 3, 2019, which in turn claims priority to French patent application number 18/52,937 filed Apr. 4, 2018. The content of these applications are incorporated herein by reference in their entireties.

The field of the present invention is that of the automated devices that are used in building construction, and more particularly the robots capable of performing mechanical operations on supports employed in the building such as building boards.

Building boards are widely used in the building industry for example to produce partitions, floors or ceilings, to clad such surfaces, thermally and/or acoustically insulate them, protect these surfaces from moisture, or even line these surfaces. The building boards correspond to sheets made of a material chosen according to its use. As an indication, building boards can be cited that comprise plaster, wood or wood particles, synthetic materials, mixed fibers, mineral particles, or a mixture of these materials, these building boards also being able to be covered with a surface coating made of a material distinct from the chosen material.

A framework serves as support for fixing such building boards to walls and ceilings. This intervention requires the production of several successive fixings of fixing means. These fixings ensure that each building board is secured to the framework. For an optimal fixing, twelve screws per square meter of building board are necessary on average. Thus, it is understood that, to produce an entire partition, this step of fixing of the building boards is particularly time consuming for the technician responsible for this operation. This represents a first drawback in the currently known art.

Moreover, the fixing tools normally used are often heavy, which adds an additional constraint for the technician. The fixing step can then become particularly tough, notably when it involves fixing a building board onto a ceiling or when it involves fixing a top part of the building board that is situated above the technician responsible for the operation. This represents a second drawback.

The aim of the present invention is to propose an automated device which corrects the abovementioned drawbacks and to also lead to other advantages.

The invention achieves this by virtue of an automated device that is configured to move in contact with a building board, the automated device comprising a chassis bearing a tool, said tool being configured to perform at least one mechanical operation on the building board, the automated device comprising at least one suction member and at least one means for setting the automated device in motion along the building board, the automated device comprising at least two chambers configured to hold the automated device against the building board, the tool being situated between said at least two chambers.

The present invention therefore aims to address the constraints mentioned above by proposing an automated device that is reliable and capable of moving easily over the building board, performing the mechanical operations normally handled by the plastering technician. Such an automated device according to the invention makes it possible to perform these mechanical operations in complete safety repeatedly on a building panel covering a wall, a ceiling or a floor. Such an automated device is suited to the constraints of adhesion and friction inherent to any inclination of the surface over which it moves.

This configuration according to the invention makes it possible to position the tool between the chambers of the automated device, and therefore to eliminate any offsetting of the tool relative to the chambers. Thus, the tool no longer provokes any imbalance on the automated device, thus favoring the adhesion of the automated device to the building panel on which it rests, even when the tool generates a significant effort while it implements the mechanical operation.

The tool is disposed between at least two chambers by being placed inside a single perimeter joining an outer edge of each chamber, such an edge being, for example, embodied by a sealing device. In other words, the tool is between the chambers and inside a polygon passing through an outer edge of the chassis.

As an indication, building boards can be cited that comprise plaster, wood or wood particles, synthetic materials, mixed fibers, mineral particles or a mixture of these materials, these building boards also being able to be covered with a surface coating made of a material distinct from the chosen material.

According to one aspect of the invention, the automated device comprises at least one suction electric motor and the at least one suction member comprises depressurization means, said depressurization means generating a depressurization in said at least two chambers when they are set in rotation by said suction electric motor. The depressurization induced by the suction electric motor and the depressurization means generates a suction force in the chambers of the automated device. Preferentially, the depressurization means comprise at least one propeller, the suction electric motor allowing said at least one propeller to be set in rotation. The rotation of the propeller then generates a depressurization in at least one chamber.

The suction force generated by the suction member of the automated device is at right angles to a general plane of extension of the chassis of the automated device, the chassis of the automated device being the constituent element of the structure of said automated device. More particularly, the general plane of extension of the chassis of the automated device is the largest plane on which the chassis of the automated device extends. This configuration makes it possible to press the automated device against the building board regardless of the inclination of the building board.

According to one aspect of the invention, the suction electric motor is powered by an electric power supply external to the automated device. Alternatively, the suction electric motor is powered by an electric power supply incorporated in the automated device.

According to another aspect of the invention, each suction member comprises at least one sealing device and a plate forming the chassis, the sealing device and the plate delimiting one of the chambers.

The chassis comprises at least two platforms, each platform comprising at least one plate, and a suction member. Each plate extends in a plane parallel to the general plane of extension of the chassis of the automated device. More particularly, each plate comprises a top face and a bottom face. The bottom face of a plate is oriented toward the building board when the automated device bears against the latter. The top face of the plate is the place which is turned toward the tool. The sealing device is located between the bottom face of the plate and the building board. Thus, each chamber defines a volume, said volume being delimited by the bottom face of the plate, by the sealing device and by a mouth of the sealing device intended to bear against the building board.

According to one aspect of the invention, each platform of the automated device supports a suction member. The suction member of a platform is then associated with the chamber which is delimited by this same platform.

According to another aspect of the invention, each chamber is also delimited by a sealing device, said sealing device being fixedly secured to the platform which delimits the chamber. More particularly, a first face of the sealing device bears against the platform of the automated device and a second face of the sealing device bears against the building board. This configuration makes it possible to limit, even eliminate, the leaks of air between the chamber and the outside environment, thus necessitating a weaker suction force to make the automated device adhere to the building board. The use of a weaker suction force allows for a reduction of the quantity of energy required by the suction member to make the automated device adhere to the building board. This specific provision of the sealing device and of the platform also guarantees that the platform comes to bear against the building board, which significantly contributes to stabilizing the automated device when the tool is applied.

According to another aspect of the invention, the platform comprises an orifice allowing communication between the chamber and an environment outside said chamber. This configuration makes it possible to limit, even to eliminate, the depressurization within the chamber.

The platform also comprises a shutting element configured to shut, partially or fully, the orifice of the platform. More particularly, the shutting element is a disk, a valve or a flap. This configuration allows for a maximum depressurization within the chamber when the orifice of the platform is fully shut by the shutting element. Conversely, the depressurization in the chamber is weaker when the shutting element does not fully shut the orifice of the platform. Thus, the element for shutting the orifice of the platform allows for a modulation of the level of depressurization within the chamber comprising such a shutting element.

The suction force necessary to make the automated device adhere to the building board can vary, notably according to the angle of inclination of the building board relative to a horizontal plane, or even if the automated device is suspended from a ceiling, or even according to a counter-force exerted by the tool on the building board, said counter-force being exerted when the tool performs a mechanical operation on the building board. Thus, the suction force generated by the suction electric motor and the depressurization means can need to be modulated. More particularly, the modulation of the suction force in a chamber can be obtained, for example, by a modulation of the speed of rotation of the propeller, or by the modulation of the aperture of the platform shutting element.

According to a first embodiment, the suction member of the automated device comprises a single suction electric motor configured to generate a suction force in said at least two chambers. More particularly, the suction member comprises a single depressurization means cooperating with said at least two chambers. Alternatively, the suction member comprises a single suction electric motor and at least two depressurization means, said at least two depressurization means each cooperating with a distinct chamber.

According to a second embodiment, the suction member of the automated device comprises at least two electric motors configured to generate a suction force in said at least two chambers, each suction electric motor cooperating with a chamber that is distinct from another chamber. More particularly, each suction electric motor cooperates with a distinct depressurization means in order to generate a suction force in a chamber that is distinct from the other chamber. In other words, each suction electric motor is associated with a single chamber.

According to another aspect of the invention, said at least two chambers are evenly angularly arranged around the tool.

This configuration makes it possible to stabilize the automated device on the building board. Thus, if the automated device comprises two chambers, said two chambers are angularly spaced apart by 180° relative to one another. Also, in the case where the automated device comprises three chambers, said three chambers are angularly spaced apart by 120° relative to one another. Furthermore, in the case where the device comprises four chambers, said four chambers are angularly spaced apart by 90° relative to one another.

According to a first alternative embodiment of the invention, each chamber extends around a central axis, the tool being disposed equidistantly from the central axis of each chamber. The central axis of a chamber is defined by a straight line which extends at right angles to the general plane of extension of the chassis of the automated device, said straight line passing through the center of the chamber. The tool is then situated on a central transverse plane of the automated device, the central transverse plane of the automated device being at right angles to the general plane of extension of the chassis and situated equidistantly from the central axis of each chamber.

According to one aspect of this first alternative of the invention, the suction member is configured to exert an identical, or substantially identical, suction force in each chamber, said chambers being disposed symmetrically relative to the tool. Two suction forces will be considered identical if their suction difference does not exceed 10% of the force of one of the suction forces.

According to a second alternative embodiment of the invention, each chamber extends around a central axis, the tool being closer to the central axis of a first chamber than the central axis of the second chamber. Thus, the tool is not located on the central transverse plane of the automated device. The tool is offset relative to a central transverse plane, the central transverse plane being transverse relative to the longitudinal plane of extension of the automated device. This configuration makes it possible for example to offset the tool relative to the central transverse plane of the automated device, thus freeing a space which can be used to house a suction electric motor, or any other peripheral device necessary to the operation of the automated device, such as, for example, the control unit or a stock of fixing devices, such as screws placed on a tape.

More particularly according to the second alternative embodiment, the suction member is configured to exert a suction force which compensates for an offset of the tool relative to the central transverse plane of the automated device. Thus, a greater suction force must be generated in a suction chamber when the tool is offset toward said suction chamber relative to the central transverse plane of the automated device.

The compensation for this offset can be obtained in several ways. For example, the speed of rotation of the depressurization means cooperating with a chamber can be modulated in order to supply a greater or lesser suction force in the chamber, said suction force being higher when the speed of rotation of said depressurization means increases.

The compensation for the difference in positioning of the tool can also be obtained by the modulation of the aperture of the orifice of the chamber via the shutting element, the shutting of the orifice of the chamber generating a greater suction force. Finally, it is possible to use chambers that have different surfaces, the surface of a chamber corresponding to the projection of the chamber onto the platform supporting the chamber.

According to one aspect of the invention, each platform comprises a passage, said passage allowing the depressurization device to generate a depressurization in the chamber. The passage allows a communication between the depressurization device and the chamber. Advantageously, the passage is positioned at the central axis of the chamber.

According to another aspect of the invention, said at least two chambers and the tool are aligned on one and the same axis. More particularly, the two chambers and the tool are arranged in a straight line relative to one another.

According to another aspect of the invention, the suction member is configured to exert a force, said force being greater than the force exerted by the weight of the automated device. This configuration allows the automated device to be pressed against the building board. More particularly, the sum of the suction forces exerted in said at least two chambers is greater than the sum of the force exerted by the weight of the automated device and the force exerted by the tool on the building board. When the tool performs a mechanical operation on the building board, the tool exerts a force on the building board, said force in turn inducing a counter-force of identical value and opposite direction. Thus, the counter-force exerted by the tool on the building board is added to the force exerted by the weight of the automated device. This configuration allows the automated device to be pressed against the building board even when the tool performs a mechanical operation on the building board.

According to one aspect of the invention, at least one platform supports the at least one means for setting the automated device in motion. The means for setting the automated device in motion bear against the building board when the automated device adheres to said building board. This configuration allows the automated device to move over the building board. Preferentially, the at least one means for setting in motion comprises at least a wheel and an electric motor for driving the wheel.

Preferentially, the means for setting the automated device in motion are supported by at least two distinct platforms. This configuration makes it possible to give the automated device a greater stability on the building board.

According to another aspect of the invention, the mechanical operation performed by the tool corresponds to an operation of fixing, cutting or punching of the building board. More particularly, the fixing of the building board onto the framework can be done using screws, staples or nails, the tool then being a fixing tool, notably a power screwdriver, a stapler or a nail gun, respectively. Also, the cutting of the building board can be done using a hole saw, a jigsaw or even a blade, the tool then being respectively a hole saw, a jigsaw or a blade. Finally, the punching of the building board can be done using abrasive sheets, the tool being configured to provoke a translational or rotational movement of the abrasive sheets against the building board, the tool then being a sander.

Various embodiments of the invention are provided, incorporating, according to all of their possible combinations, the various optional features explained hereinbelow.

Other features, details and advantages of the invention will also emerge through the following description on the one hand, and several exemplary embodiments given in an indicative and nonlimiting manner with reference to the attached schematic drawings on the other hand, in which.

Hereinafter in the description, the bottom of the automated device corresponds to a face of the automated device on the side of the chambers. Conversely, the top of the automated device corresponds to a face of the automated device opposite the bottom of the automated device.

Figure 1:
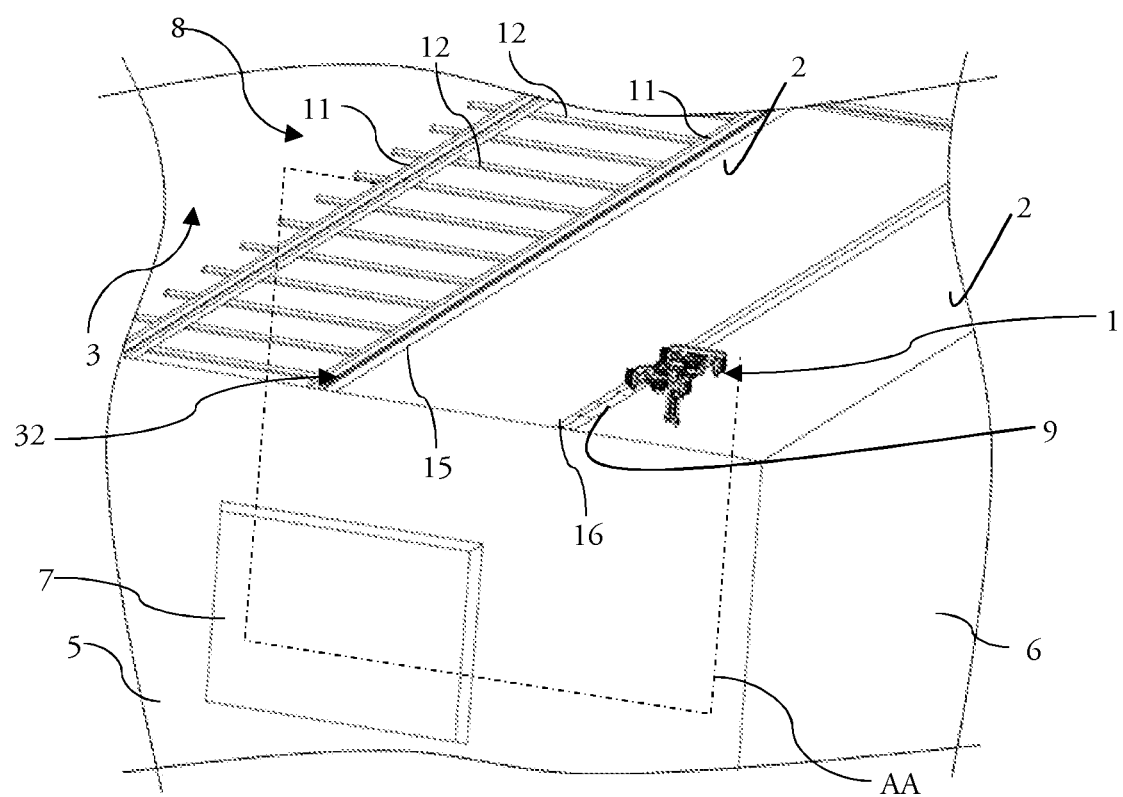
FIG. 1 represents a perspective view of an exemplary embodiment of an automated device according to the invention, said automated device being in a situation of use.

Referring first of all to FIG. 1, an automated device 1 that is the subject of the present invention can be seen in a real-life situation. The latter moves over a building board 2 which covers a ceiling 3 situated in a room schematically represented in FIG. 1 by two wall facets 5, 6 inclined at 90° relative to a horizontal plane, this horizontal plane being parallel to a main plane of extension of the ceiling 3. One of the wall facets has an opening made by a window 7. The other does not. This situation scenario is nonlimiting, and the invention envisages having the automated device 1 disposed on a building board 2 participating in forming or covering one or the other of the wall facets 5, 6.

The building board 2 is thus fixedly secured to the ceiling 3 via a framework 8. More specifically, a plurality of building boards 2 are fixedly secured to this ceiling via this framework 8.

According to the example illustrated in FIG. 1, the fixing of one of these building boards 2 onto this ceiling 3 is currently being done, that is to say that the automated device 1 according to the invention is in the process of fixing the building board 2 onto the framework 8, itself fixed previously onto the ceiling 3. The fixing of the building board 2 onto the framework 8 is an example of mechanical operation that the automated device 1 can realize, the description given hereinbelow being related to this operation of fixing of the building board 2 onto the framework 8.

This framework 8 can for example consist of a metal framework comprising rails 11 mounted on uprights 12 at right angles to these rails 11. For example, the framework 8 can comprise a plurality of rails 11, the rails 11 being supported by a plurality of uprights 12, the uprights 12 extending at right angles to the rails 11. These rails 11 respectively form a zone for supporting and fixing the building board 2. In other words, each building board 2 comprises a first edge 15 intended to be fixed onto a first rail and a second edge 16 intended to be fixed onto a second rail. It will also be possible to provide for each building board 2 to also be fixed onto two additional central rails, that is to say a third rail and a fourth rail, both for example parallel to this first rail and/or to this second rail.

The automated device 1 according to the invention is thus configured to fix each building board 2 onto each of these rails 11. To do this, the automated device 1 according to the invention has means allowing it to move over the building board 2 and means which allow it to adhere independently to the building board 2.

Alternatively, this framework 8 can be made of wood. It is understood that any other material compatible with the invention can be envisaged to make this framework 8 without departing from the context of the invention.

As represented, the building board 2 is fixedly secured to the framework 8 using fixing means 9. It is understood that each of these fixing means 9 passes through the building board 2 to be inserted into one of the rails 11 of the framework 8 and thus ensure this fixed securing. For example, these fixing means 9 can be screws, nails or even staples. Two rectilinear rows of fixing means 9 are illustrated in FIG. 1. Advantageously, two adjacent building boards 2 are fixed to one and the same rail. Alternatively, it will be possible to provide for each building board 2 to be fixed onto rails which are specific to it.

Figure 2:
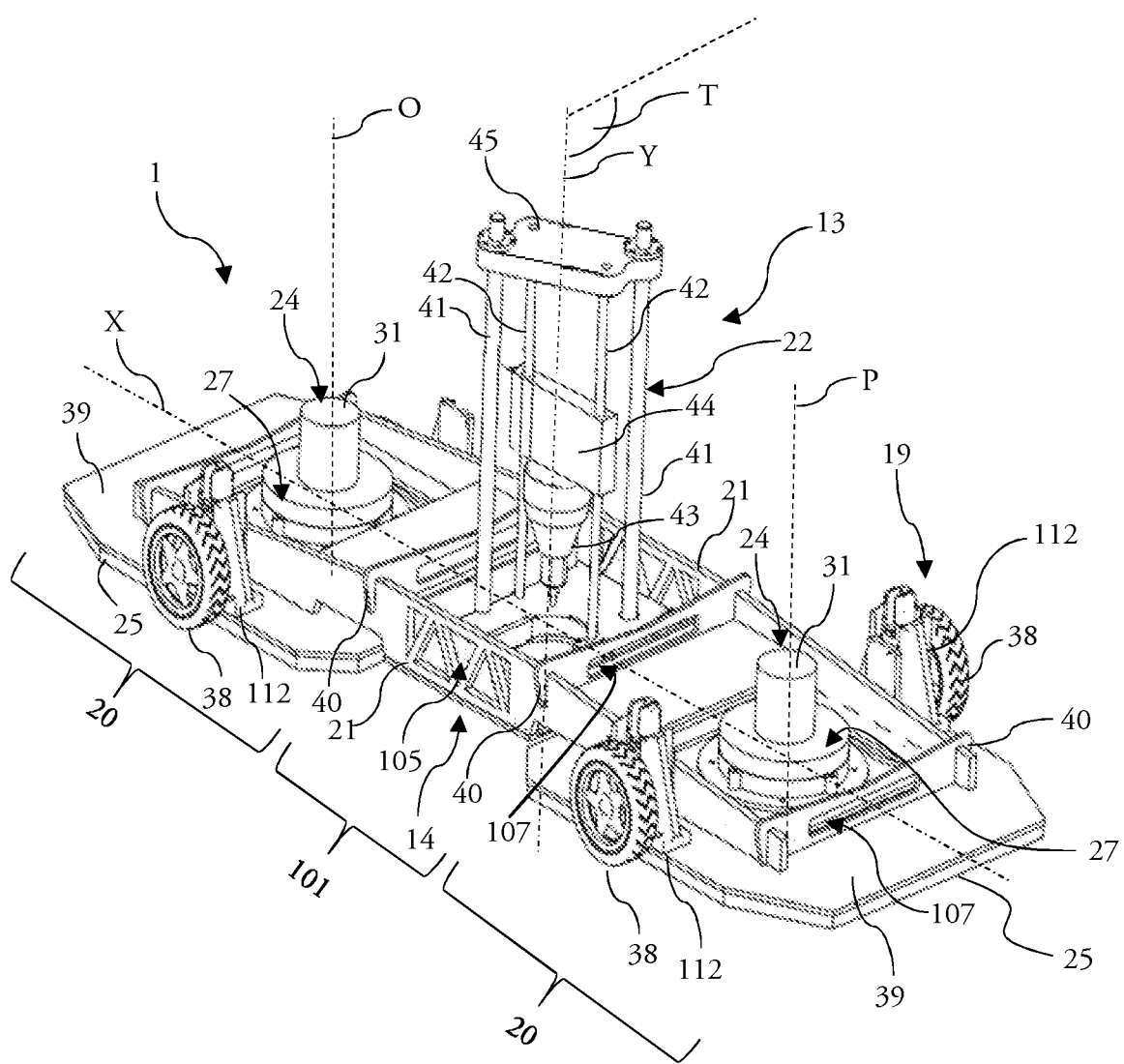
FIG. 2 represents a perspective view of an exemplary embodiment of an automated device according to the invention, said device comprising two platforms.

As represented in FIG. 2, the automated device 1 comprises only two platforms 20. Each platform 20 comprises a plate 39, a suction member 24 and a suction electric motor 31.

The automated device 1 comprises a chassis 14 bearing a tool 13 configured to perform a mechanical operation, the automated device 1 comprising two suction members 24 and four means 19 for setting in motion. Each suction member 24 comprises a chamber 26 allowing the automated device 1 to adhere to a building board, the tool 13 being situated between the chambers 26. It is understood here that the tool 13 is disposed in a zone formed between the platforms 20. This configuration with the tool 13 positioned between the chambers 26 makes it possible to stabilize the automated device 1 on the building board against which the automated device 1 is bearing, even when the tool is performing the mechanical operation on the building board.

The automated device 1 extends along a longitudinal axis X and along a transverse axis X', these axes being at right angles to one another.

The chassis 14 of the automated device 1 extends in a plane, called general plane of extension of the chassis and which corresponds to the longitudinal plane of extension of the automated device 1, the general plane of extension being that within which the longitudinal axis X and the transverse axis X' fall.

The chassis 14 of the automated device 1 corresponds to the supporting structure of the automated device 1. Thus, the chassis 14 comprises reinforcements 21. The reinforcements 21 have voids 105 formed for example facing a central part 101 of the chassis 14. According to the example illustrated here, these voids 105 each have a triangular form, but it is understood that any other form would be able to be envisaged without departing from the context of the invention.

The chassis 14 comprises additional reinforcements 40. The additional reinforcements 40 link two reinforcements 21 to one another. The additional reinforcements 40 extend at right angles to the axis along which the reinforcements 21 that they link extend. Thus, the additional reinforcements 40 help stiffen the chassis 14 of the automated device 1. According to the example illustrated, a pair of additional reinforcements 40 is arranged facing each platform 20. More specifically, the additional reinforcements 40 are distributed pairwise around each suction member 24.

The additional reinforcements 40 comprise at least a removal of material 107 such that these additional reinforcements 40 do not make the automated device 1 heavier. According to the example illustrated, each removal of material 107 takes the form of a slit which extends according to the axis of the additional reinforcement 40 in which said removal of material 107 is formed.

The chassis 14 comprises a central part 101, said central part 101 being situated between the platforms 20. The central part 101 is supported by the reinforcements 21 of the chassis 14.

The chassis 14 bears the tool 13. The tool 13 of the automated device 1 extends along an axis Y which extends at right angles to the plane defined by the longitudinal axis X and the transverse axis X'. The tool 13 extends upwardly from the automated device 1.

The central part 101 of the chassis 14 comprises an aperture 103, the aperture 103 allowing the tool 13 to access the building board in order to perform the mechanical operation on said building board.

The platforms 20 are disposed around the tool 13 of the automated device 1.

Each platform 20 comprises a plate 39, a sealing device 25, a chamber 26, a means 27 and a suction electric motor 31. Each plate is fixed onto the reinforcements 21 of the chassis 14. Each chamber 26 is at least partially delimited by a platform 20 that is distinct from another platform 20. Each chamber 26 is situated on a bottom face of the plate 39, the bottom face of the plate 39 being the face of this plate that is oriented against the building board when the automated device 1 adheres to the latter. In the exemplary embodiment illustrated in FIGS. 2 and 3, each chamber 26 has an overall octagonal form. Alternatively, each chamber 26 can have a overall circular, triangular or rectangular form, or any other geometrical form.

Each suction member 24 comprises a passage 28 formed through each of the plates 39, said passage 28 allowing each suction electric motor 31 to generate a depressurization in a corresponding chamber 26.

Each chamber 26 extends around a central axis O, P, the central axis O, P of a chamber 26 being defined by a straight line which extends at right angles to the general plane of extension of the automated chassis, said straight line passing through the center of the chamber 26.

Each platform 20 supports means 19 for setting the automated device 1 in motion, the two platforms 20 being situated symmetrically relative to one another on either side of the tool 13. Each of the two platforms 20 comprises two means 19 for setting in motion. Each means 19 for setting in motion comprises a wheel 38 and a driving electric motor, not represented, configured to drive the wheel 38 with which it cooperates. Each wheel 38 comes to bear against the building board during use of the automated device 1. Each wheel 38 is supported by a support 112, said support being fixedly secured to the plate 39 of a platform 20.

In general, this fixing tool 13 extends primarily in the direction Y of extension at right angles to the plane in which the plates 39 of the chassis 14 extend. The fixing tool 13 comprises at least one head 43 controlled by a motor 44, for example an electric motor. As represented in FIG. 2, this head 43 and the motor 44 are borne by a boom 22 formed by two pillars 41 linked to one another by a rear block 45. More particularly, the head 43 and the motor 44 are linked to the rear block 45 of the boom 22 by two pillars 42 which extend parallel to the direction Y of extension of the fixing tool 13.

This configuration in which the tool 13 is positioned between the platforms 20, and therefore between the chambers 26 partially delimited by the platforms 20, makes it possible to ensure the stability of the automated device 1 on the building board, even when the tool 13 is performing a mechanical operation on the building board.

Figure 3:
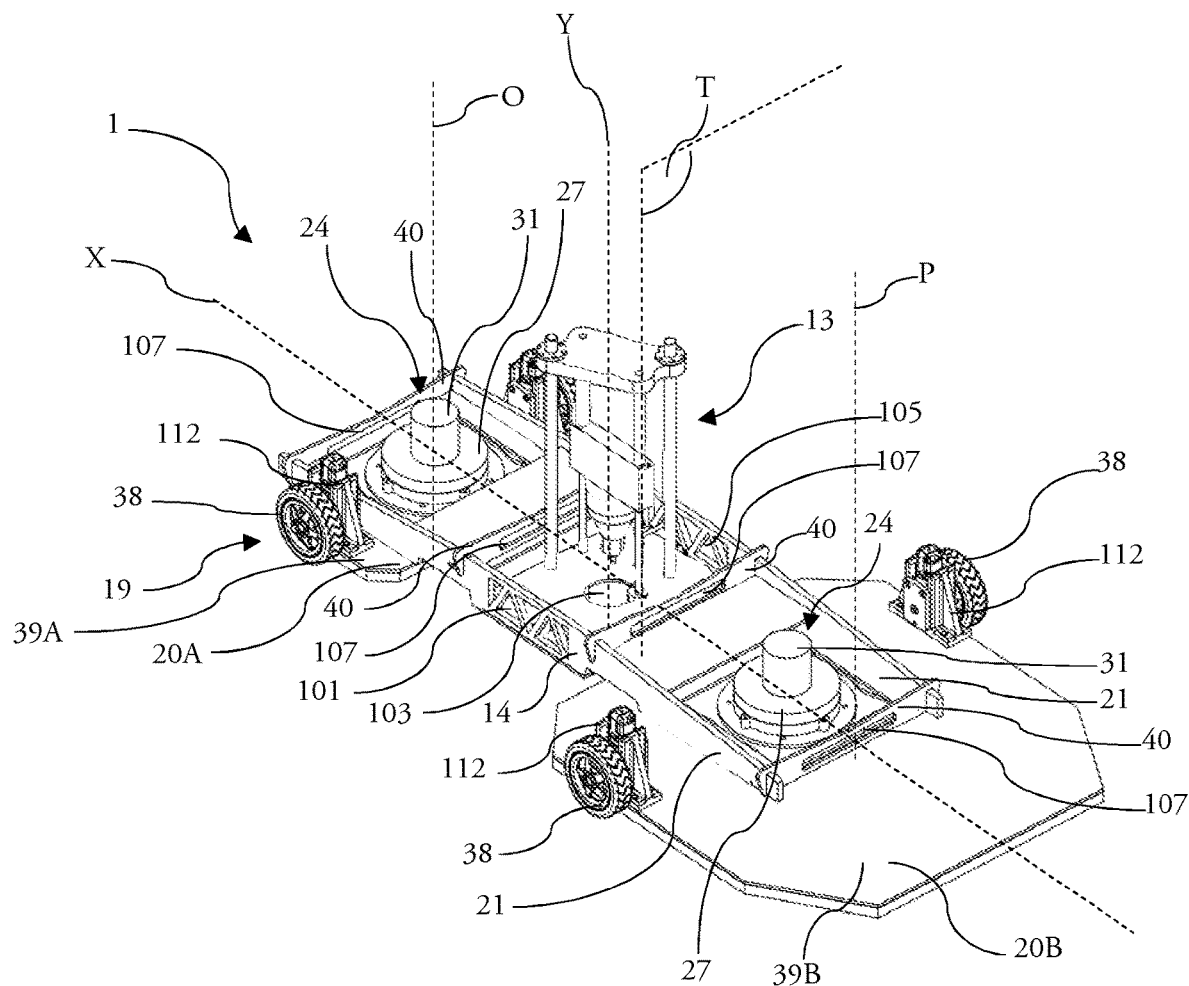
FIG. 3 represents a perspective view of an exemplary embodiment of an automated device according to the invention, said device comprising two chambers of different sizes.
Figure 4:
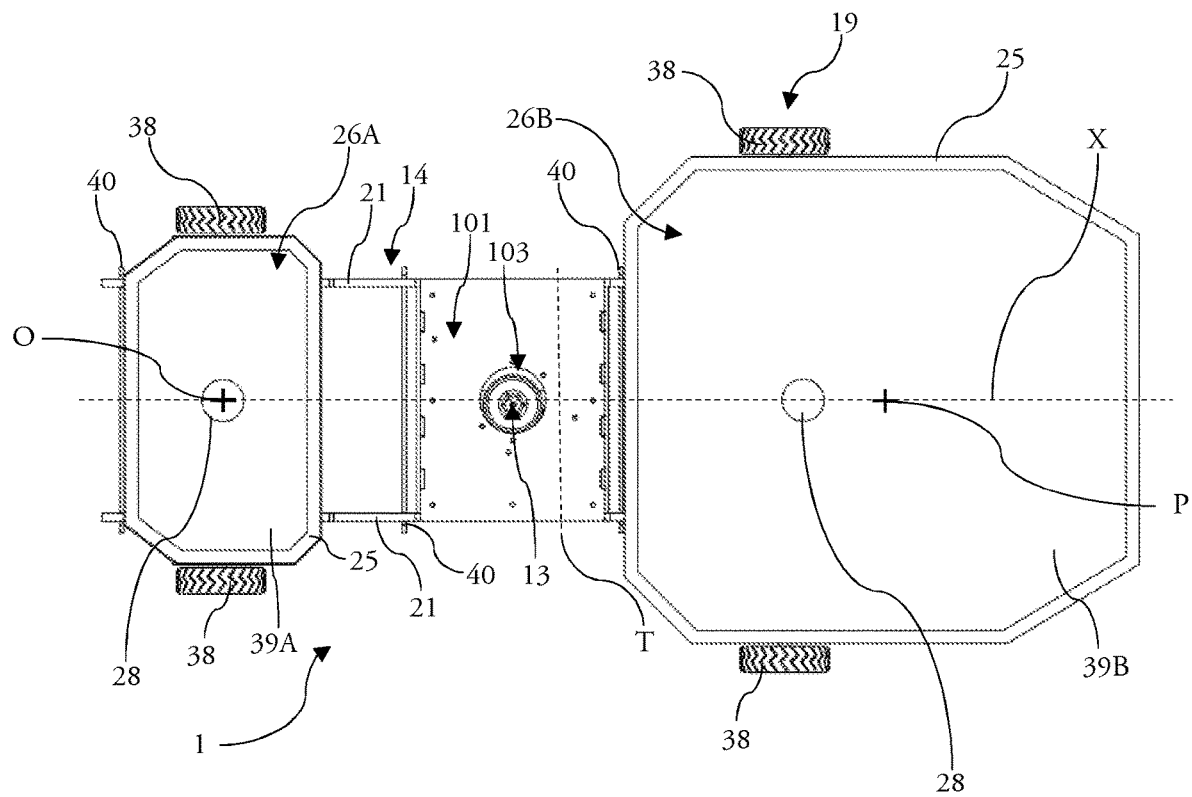
FIG. 4 represents a bottom view of the exemplary embodiment illustrated in FIG. 3.

Referring to FIGS. 3 and 4, an exemplary embodiment of an automated device 1 according to the invention is described, said automated device 1 comprising two platforms 20A, 20B of different sizes. Thus, a first platform 20A comprises a first plate 39A and a second platform 20B comprises a second plate 39B, the first plate 39A having a surface projected onto a plane that is smaller than the surface of the second plate 39B, projected onto one and the same plane.

The first platform 20A partially delimits a first chamber 26A. The second platform 20B partially delimits a second chamber 26B. The first chamber 26A and the second chamber 26B are each delimited by a sealing device 25 and by the first plate 39A or the second plate 39B. The second chamber 26B has a volume greater than a volume of the first chamber 26A.

Each chamber 26 is delimited on its outline by the sealing device 25, the sealing device 25 being fixedly secured to the plate 39 of the platform 20 supporting said chamber 26. The sealing device 25 is a seal which comes to bear against the building board when the automated device 1 is being used, said sealing device 25 being positioned on a bottom face of the plate 39 of each platform 20.

The exemplary embodiment illustrated in FIGS. 3 and 4 thus makes it possible to compensate for the difference in positioning of the tool 13 relative to a central transverse plane T of the automated device 1, the central transverse plane T of the automated device 1 being at right angles to the general plane of extension of the chassis and situated equidistantly from the central axis O of the first chamber 26A and the axis P of the second chamber 26B. Specifically, the offsetting of the tool 13 provokes an offsetting of the force that it generates when it performs the mechanical operation. The purpose of the difference in projected surfaces between the first chamber 26A and the second chamber 26B is to manage this offsetting of force by offering a greater force in the chamber to which the tool is closest.

Thus, the second chamber 26B has a projected surface greater than the projected surface of the first chamber 26A. The projected surface of the second chamber 26B comprises a length greater than the length of the projected surface of the first chamber 26A, the length being the dimension parallel to the longitudinal axis X. The projected surface of the second chamber 26B also comprises a width greater than the width of the projected surface of the first chamber 26A, the width being the dimension parallel to the transverse axis X'.

The passage 28 of the second chamber 26B is offset relative to the central axis P of the second chamber 26B. The passage 28 is thus offset on the axis X toward the tool 13 relative to the central axis P of the second chamber 26B.

The means 19 for setting in motion that are supported by the second platform 20B are also offset relative to the central axis P of the second chamber 26B, such an offset being applied toward the tool 13 relative to the axis P of the second chamber 26B.

Figure 5:
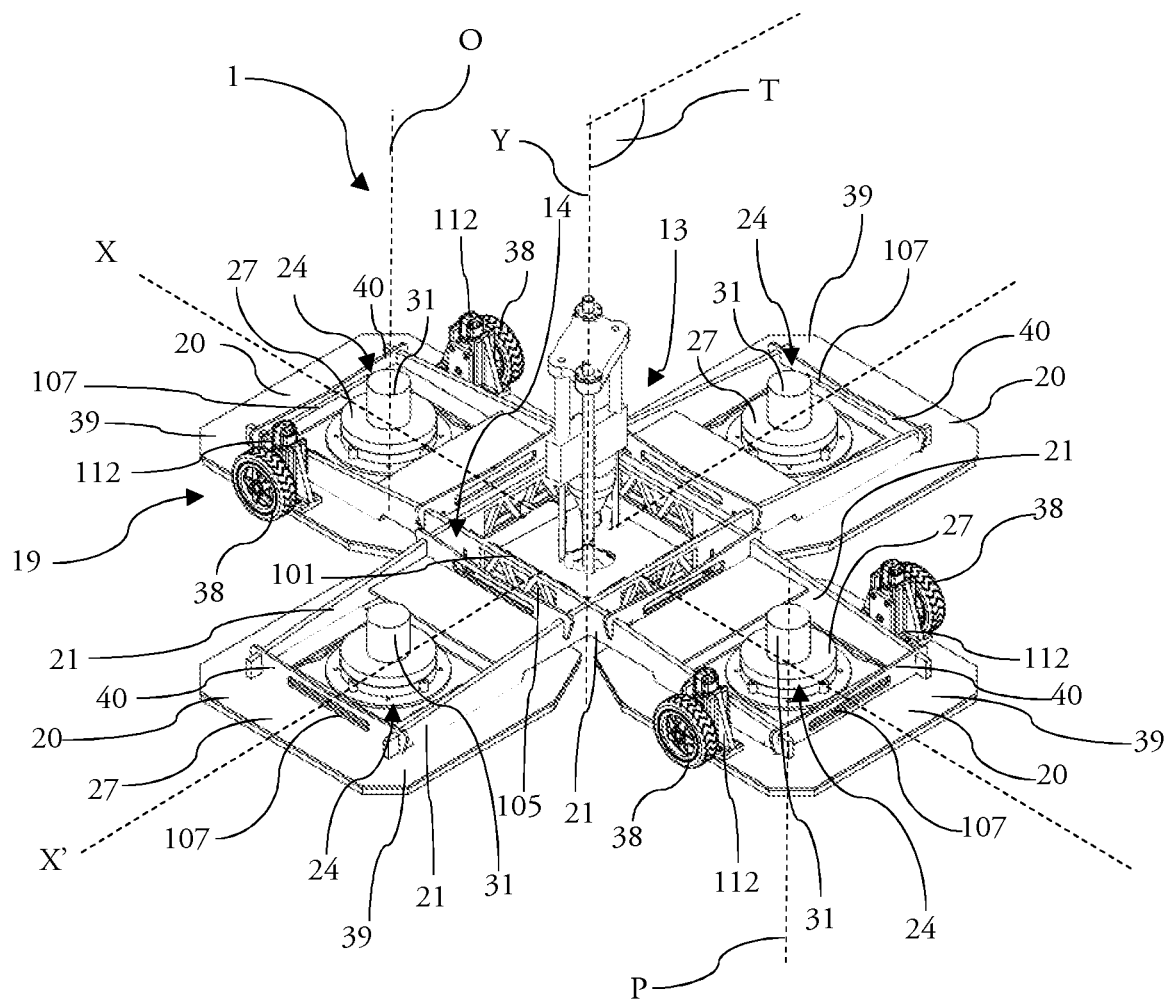
FIG. 5 represents a perspective view of an exemplary embodiment of an automated device according to the invention, said device comprising four platforms.
Figure 6:
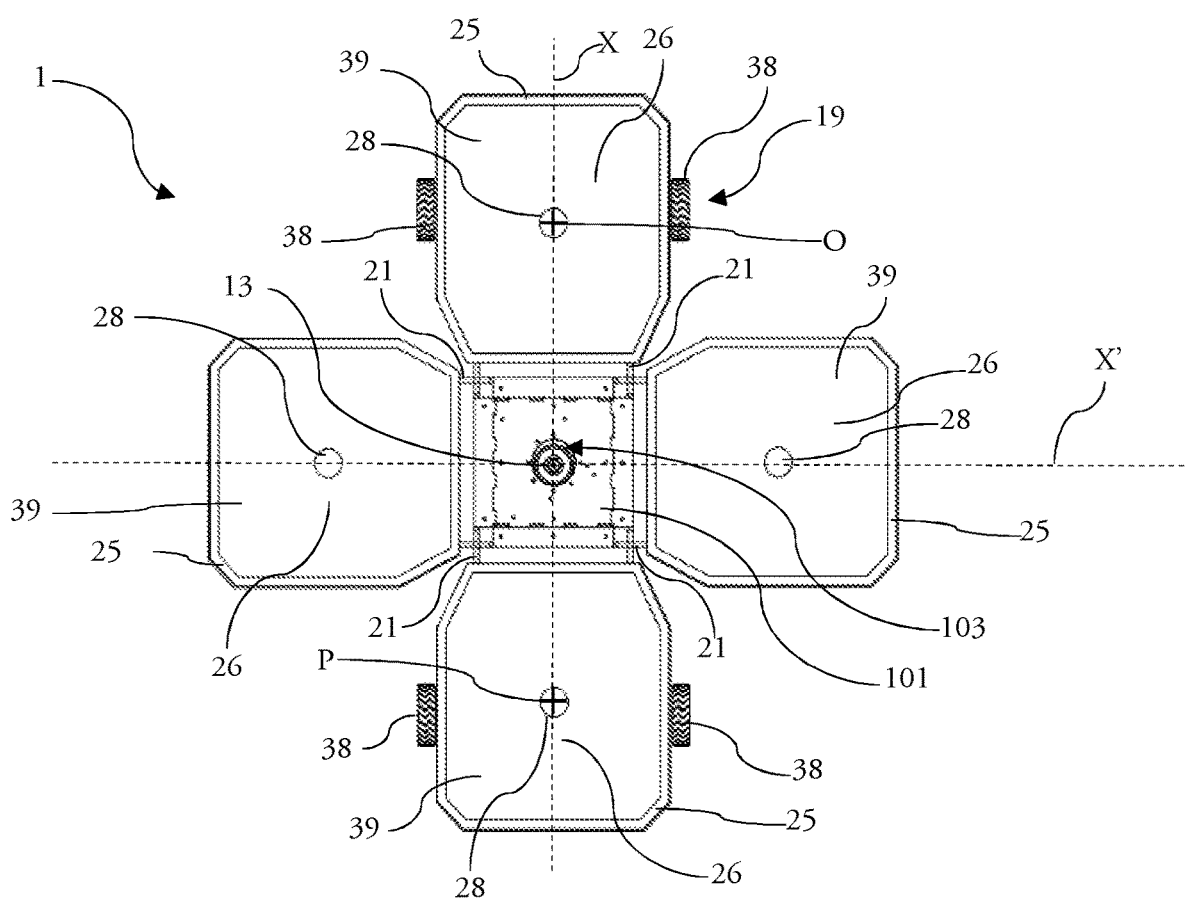
FIG. 6 represents a bottom view of the exemplary embodiment illustrated in FIG. 5.

Referring to FIGS. 5 and 6, an exemplary embodiment of an automated device 1 according to the invention is described, said automated device 1 comprising four platforms 20.

The chassis 14 comprises the four platforms 20, said platforms 20 being disposed in the plane defined by the longitudinal axis X and by the transverse axis X' of the chassis 14. The four platforms 20 are evenly angularly disposed around the point of intersection of the axis Y of the tool 13 with the plane defined above, each platform 20 being thus angularly spaced apart by 90°.

Each chamber 26 is delimited on its outline by a sealing device 25, the sealing device 25 being fixedly secured to the plate 39 of the platform 20 supporting said chamber 26. The sealing device 25 is a seal which comes to bear against the building board when the automated device 1 is being used, said sealing device 25 being positioned on an interior face of the plate 39 of each platform 20.

Two platforms 20 support the means 19 for setting the automated device 1 in motion, the two platforms 20 being situated symmetrically relative to one another on either side of the tool 13. Each of the two platforms 20 comprises two means 19 for setting in motion. Each means 19 for setting in motion comprises a wheel 38 and a driving electric motor, not represented, configured to drive the wheel 38 with which it cooperates. Each wheel 38 comes to bear against the building board when the automated device 1 is being used. Each wheel 38 is supported by a support 112, said support being fixedly secured to the plate 39 of a platform 20. The other two platforms 20 have no means 19 for setting the automated device 1 in motion.

The tool 13 is positioned between the four platforms 20. This configuration allows the automated device 1 to be stable on the building board 2 even when the tool 13 is performing a mechanical operation on the building board 2.

The description of the platforms 20 given above is valid for each of the four platforms 20 that make up the variant illustrated in FIGS. 5 and 6.

To sum up, the invention relates to an automated device 1 configured to move in contact with a building board 2. The automatic device 1 comprises a chassis 14 bearing a tool 13, said tool 13 being configured to perform a mechanical operation on the building board 2. The automated device 1 comprises at least one suction member 24 and at least one means 19 for setting the automated device 1 in motion. The suction member 24 comprises at least two chambers 26 allowing the automated device 1 to adhere to the building board 2, the tool 13 being situated between the chambers 26, regardless of whether there are two or four of them.

Obviously, the invention is not limited to the examples which have just been described and many modifications can be made to these examples without departing from the scope of the invention. In particular, the various features, forms, variants and embodiments of the invention can be combined with one another in various combinations in as much as they are not mutually incompatible or exclusive. In particular, all the variants and embodiments described previously can be combined with one another.

The invention claimed is:

1. An automated device configured to move in contact with a building board, the automated device comprising a chassis bearing a tool, said tool being configured to perform at least one mechanical operation on the building board, the automated device comprising at least one suction member and at least one means for setting the automated device in motion along the building board, wherein the suction member comprises at least two chambers configured to hold the automated device against the building board, the tool being situated between said at least two chambers and inside a polygon defined by an outer edge of the chassis, wherein each chamber extends around a central axis, the tool being closer to the central axis of a first chamber than the central axis of the second chamber and wherein the suction member is configured to exert a suction force which compensates for an offset of the tool relative to a central transverse plane of the automated device.

2. The automated device as claimed in claim 1, comprising at least one suction electric motor linked to the chambers so as to generate a depressurization in these chambers.

3. The automated device as claimed in claim 1, wherein the suction member comprises at least one sealing device and a plate forming the chassis, the sealing device and the plate delimiting one of the chambers.

4. The automated device as claimed in claim 1, wherein said at least two chambers are evenly angularly disposed around the tool.

5. The automated device as claimed in claim 1, wherein a surface projected onto a plane of one chamber is greater than a surface projected onto this same plane of the other chamber.

6. The automated device as claimed in claim 1, wherein at least two chambers and the tool are aligned on one and the same axis.

7. The automated device as claimed in claim 1, wherein the suction member is configured so that the sum of the suction forces exerted in at least the two chambers is greater than the sum of a force exerted by the weight of the automated device and a force exerted by the tool on the building board.

8. The automated device as claimed in claim 1, wherein the tool is chosen from among a power screwdriver, a stapler, a nail gun, a hole saw, a jigsaw, a blade or a punch.

9. An automated device configured to move in contact with a building board, the automated device comprising a chassis bearing a tool, said tool being configured to perform at least one mechanical operation on the building board, the automated device comprising at least one suction member and at least one means for setting the automated device in motion along the building board, wherein the suction member comprises at least two chambers configured to hold the automated device against the building board, the tool being situated between said at least two chambers and inside a polygon defined by an outer edge of the chassis, wherein the suction member is configured to exert a suction force which compensates for an offset of the tool relative to a central transverse plane of the automated device.

* * * * *